(12) United States Patent
Rasmussen et al.

(10) Patent No.: US 7,578,397 B2
(45) Date of Patent: Aug. 25, 2009

(54) DEVICE FOR THE TREATMENT OF FLUIDS

(75) Inventors: Christian Rasmussen, Tjele (DK); Finn Beldring, Virum (DK)

(73) Assignee: Grundfos a/s, Bjerringbro (DK)

( * ) Notice: Subject to any disclaimer, the term of this patent is extended or adjusted under 35 U.S.C. 154(b) by 148 days.

(21) Appl. No.: 11/571,963

(22) PCT Filed: Jun. 29, 2005

(86) PCT No.: PCT/EP2005/006967

§ 371 (c)(1),
(2), (4) Date: Apr. 16, 2007

(87) PCT Pub. No.: WO2006/005442

PCT Pub. Date: Jan. 19, 2006

(65) Prior Publication Data

US 2008/0006572 A1    Jan. 10, 2008

(30) Foreign Application Priority Data

Jul. 14, 2004    (EP) ................... 04016525

(51) Int. Cl.
*C02F 3/08* (2006.01)
*B01J 19/18* (2006.01)
*B01D 33/46* (2006.01)
(52) U.S. Cl. .............. 210/396; 210/615; 210/619
(58) Field of Classification Search .......... 210/396, 210/402, 619, 150, 151, 615, 618
See application file for complete search history.

(56) References Cited

U.S. PATENT DOCUMENTS

| | | | | |
|---|---|---|---|---|
| 5,158,691 A | * | 10/1992 | McEwen et al. | 210/791 |
| 5,593,583 A | * | 1/1997 | Geldmacher | 210/331 |
| 6,123,841 A | * | 9/2000 | Gotoh | 210/167.22 |
| 2004/0232070 A1 | * | 11/2004 | Jensen et al. | 210/619 |

FOREIGN PATENT DOCUMENTS

| | | | |
|---|---|---|---|
| DE | 2405106 | * | 8/1975 |
| DE | 2932522 | * | 2/1981 |
| EP | 1190756 | * | 3/2002 |
| JP | 55-134618 | * | 10/1980 |
| JP | 63-178895 | * | 7/1988 |
| WO | WO 02/094724 | * | 11/2002 |

OTHER PUBLICATIONS

English Translation of DE 2932522, Morio Yamamoto, Schreiber Translation, Inc., Nov. 2008.*

* cited by examiner

*Primary Examiner*—Fred Prince
(74) *Attorney, Agent, or Firm*—Panitch Schwarze Belisario & Nadel LLP

(57) ABSTRACT

A device is provided for fluid treatment, in particular for waste water treatment. The fluid is led along a surface (3) coated with biological material. A wiper element (5) is provided, which brushes the surface (3) not as a whole, but in paths. The path course is selected such that the coated surface (3) is successively brushed in sections.

35 Claims, 10 Drawing Sheets

DEVICE FOR THE TREATMENT OF FLUIDS

CROSS-REFERENCE TO RELATED APPLICATIONS

This application is a Section 371 of International Application No. PCT/EP2005/006967, filed Jun. 29, 2005, which was published in the German language on Jan. 19, 2006, under International Publication No. WO 2006/005442 A1 and the disclosure of which is incorporated herein by reference.

BACKGROUND OF THE INVENTION

The invention relates to a device for fluid treatment, in particular for waste-water treatment, wherein the fluid is led along or through at least one surface coated with material.

Such devices are known in the prior art, be they in the form of filters which hold back particles of a certain size, or in the form of biological fluid treatment devices, with which a fluid is led along a surface coated with micro-organisms. Such a device is known, for example, from International application publication No. WO 02/094724 A1.

Irrespective of whether the fluid to treated is guided through or along a surface, problems occur with continuous operation, to the extent that the flow resistance increases due to a clogging of the permeated surface or due to a growth of the coated surface. It is therefore necessary to carry out a cleaning at regular intervals, in order to reduce the flow resistance. With filters, this is typically accomplished by way of back-flushing, or by way of mechanical removal of the particles, but has the disadvantage that the method takes its course in a discontinuous manner, and the flow resistance increases between the individual cleaning cycles, i.e. is thus not constant.

With devices for biological fluid treatment, it is furthermore necessary to remove the microorganisms sticking to the surface, only inasmuch as they are superfluous, since the continued presence of microorganisms is absolutely necessary for the continued, effective fluid treatment. With the device known from WO 02/094724 A1, this is achieved in that the disk stacks which mesh with one another almost contact one another in partial regions of radial webs, so that these webs constantly remove the material coating of the opposite disk over the whole surface. An accumulation may therefore essentially only occur in the recessed regions between the webs, whereby the active surface of the disks is reduced. A further disadvantage of this arrangement is the fact that only the excess of the grown-on microorganism material is removed, whereas no renewal is effected in the base, which may lead to the device losing its efficiency in the course of time.

BRIEF SUMMARY OF THE INVENTION

Against this background, it is the object of the invention to design a device for fluid treatment of the known type, such that the above mentioned disadvantages are avoided, in particular, the material adhering to the surface is continuously and, where possible, completely exchanged, in order to ensure a constant activity of the device, with a flow resistance which is as constant as possible even over a longer period of time.

The device for fluid treatment according to the invention, wherein the fluid is led along or through at least one surface coated with material, comprises at least one wiper element which brushes over the surface in a pathwise manner, wherein the course of path (stroke) is selected such that the coated surface is brushed over successively in sections. The basic concept of the present invention is therefore to treat the surface coated with material, be it a filter or a surface coated with biological material (e.g., microorganisms), in a pathwise manner with a wiper element, i.e., to always brush over only a part of this surface with the wiper element. The wiper elements may be used particularly advantageously for cleaning accumulations on osmosis filters for fluid treatment. The wiper element is thereby always led on a path whose course is selected such that the coated surface is brushed over successively in sections, but as a whole as completely as possible.

The coated surface may therefore be freed of adhering material in a continuous manner and down to the base by way of one or more wiper elements. Since the application of the wiper element is only effected in sections, it is ensured that only a portion of the surface is freed from adhering material, so that the material on the region next to the path, thus of the remaining surface, remains there. In this manner and with a suitable design of the wiper element, a material removal down to the base of the surface may be effected, i.e., one may also remove older, underlying material layers. On the other hand, with a suitable course of the path, a continuous wiping during operation may be effected, so that a completely continuous treatment method is possible, and the flow resistance essentially always remains the same.

Advantageously, a wiper element is designed such that it has a narrow side and a wide side, and is guided on path sections in a manner such that it wipes in an alternating manner on a path section in a first direction essentially with its wide side, and then on a path section in a second direction essentially with its narrow side. In this manner, one may achieve a targeted material transport over the surface, wherein such a movement is comparatively easy to realize with regard to design, as will be explained once again in detail further below.

Advantageously, several wiper elements are provided which brush over different path sections and which are preferably coupled to one another in movement. Such an arrangement has the advantage that, with a suitable path arrangement, only a comparatively small movement is to be executed on account of the multitude of wiper elements, which is advantageous with regard to design and drive technology.

The wiper element or elements may either serve for cleaning a filter surface, i.e., for the pathwise removal of the sediment precipitated on the filter surface, or instead for removing biological material from a surface, as is subjected to flow in a lengthwise manner with biological filters.

The surface coated with material may basically have any shape, and with filters it is usually the case of plane surfaces, but the lateral surface of a cylinder may also form such a surface. Then, it is useful to arrange the wide side of the wiper elements such that these run essentially parallel to the cylinder axis. Such a cylinder lateral surface may form the surface of a biological filter, as well as a mechanical filter (in the manner of a screen drum).

The device according to the invention is not limited to applications in waste-water treatment technology, but may also be employed in other fields, for example in the form of a chemical reactor with which reaction products are removed by the wiper, or optionally also other deposits, for example in order to clean a catalyser surface. The reactor may be permeated by gaseous as well as liquid substances, while the wiper elements remove solid, powdery, pasty, or fluid substances.

For biological waste-water treatment in the initially mentioned manner, it is particularly advantageous if the surface coated with material is formed by sides of disks, which may be moved relative to one another. In this case, at least one wiper element is allocated to a disk side, preferably however to each disk side, so that the wiper elements mutually ensure a material removal on opposite sides of adjacent disks. Then, the movement of the wiper elements along the disk sides, thus the course of the path, is controlled via the movement of the disks relative to one another. Here, by suitable arrangement of the wiper elements and a selection of the rotation direction of the disks, the material transport of adjacent disks, may be optionally effected in a different direction, which is of particular significance if different reaction products on adjacent disks are to be removed.

In order to achieve a packing density as high as possible, i.e., to obtain in a small space a surface as large as possible coated with material, and thus one which is biologically effective, it is particularly expedient to arrange the disks parallel with a spacing from one another, in a manner such that the wiper elements are effective between adjacent disks. On account of the parallel disks, the reciprocally effective wiper elements are then constantly in engagement, i.e., they execute wiping functions as soon as the disks are moved relative to one another.

The wiper elements themselves, may be formed in an advantageous manner by wipers which extend essentially perpendicularly from a disk in the direction of the opposite disk, so that their edges directed to the opposite side, wipe material on this oppositely lying side. Such a wiper formation is particularly advantageous with the arrangement of several wipers, since at least when a wiping is to be effected down to the base of the opposite disk side, the wipers may simultaneously serve for maintaining the spacing between adjacent disks.

In order to succeed in brushing with the wipers over the whole disk surface in sections, and thereby effecting a targeted material transport of the removed material, it is advantageous if adjacent disks are not only moved relative to one another in a rotational manner, but also in a translatory manner, and are driven accordingly. Here, the movement is advantageously effected in planes parallel to the disks arranged parallel to one another.

It is advantageous if adjacent disks are moved relative to one another in a manner such that a wiper element on the opposite disk with its wide side describes an essentially radial working path, and subsequently with its narrow side executes a return path or vice versa. Here, the beginning of the return path and the end of the working path should lie on the same disk radius, and vice versa. The material transport is effected from the inside to the outside or preferably from the outside to the inside by way of the essentially radially directed movement with the wide side. The return movement, however, is effected essentially with the narrow side, so that the material which has already been transported or also that which is still located on the disk is not appreciably moved by the return moment, since the narrow side tends to carry out a cut through the material rather than a material transport. It is thereby ensured that a wiper element transports material from one radius to another radius. The arrangement of the wiper elements on a disk is here usefully selected such that the annular wiping regions, which then result and which are formed by essentially radially running paths, overlap, so that ultimately, by way of all wiper elements, a radial material transport is effected from the outside to the inside or from the inside to the outside, depending on the arrangement of the wipers and the course of movement of the disks.

In order to achieve the previously mentioned movement action, it is useful to guide one or more wiper elements on hypocycloidal or epicycloidal paths over the disks, as this will be described in detail further below.

If several wiper elements are guided over the disk on hypocycloidal or epicycloidal paths on different radii, it is useful to set the path courses such that the hypocycloidal or epicycloidal paths run in annular sections which connect and overlap. An effective material transport from one disk diameter to another disk diameter may then be effected, in that the material is first transported over an annular section and then in a suitable manner taken over in the next annular section and transported further. A main movement direction directed from the outside to the inside is particularly advantageous for a biological fluid treatment, wherein usefully the flow direction of the fluid should run in this direction. The material parts detaching from the disk may then be transported away with the fluid flow, i.e., be removed, without there existing the danger of this sticking to a region of a disk which lies behind in the material transport direction.

In a further embodiment of the invention, in order to be able to realize in a small space a surface as large as possible coated with material for the fluid treatment, one envisages arranging at least two disk stacks, such that one disk of the one stack is adjacent to at least one disk of the other stack, wherein a fluid to be treated is guided between these adjacent disks of the disk stacks. Furthermore, wiper elements are arranged between adjacent disks, and in each case proceeding from one disk, reach the opposite one, and by way of the material removal in sections, act in a channel-forming manner.

The disks are thereby advantageously designed in an annular manner, so that the fluid may be fed or led away through the central recesses in the disks, and otherwise flows between the disks. Adjacent disks or disk stacks are driven advantageously in the same direction, but with a different rotational speed.

The previously mentioned movement procedures of the wiper elements, in particular the hypocycloidal or epicycloidal paths, may be achieved in a manner which is simple with regard to design, in that disks lying adjacent to one another are mounted and driven eccentrically to one another. Here, the disks of the meshing stacks are advantageously designed in an annular manner and have a different outer diameter with preferably the same radial annular width. They are in each case rotatably mounted and are driven with the same peripheral speed, so that on account of rotational axes which differ from one another, as well as the different outer diameters, the disks of both stacks have a different angular speed despite an equal peripheral speed. A translatory and rotational relative movement of the stacks to one another is thereby forcibly effected, which produces epicycloidal or hypocycloidal paths of the wiper elements on the disks.

With regard to design, it is particularly expedient if the disks of at least one stack have a front-end outer toothing, since then a rotational drive may be realized in a simple manner by way of a spur gear meshing on this outer toothing. With such a toothing, disk stacks arranged next to one another may also be driven with little effort, in that these are either brought into direct engagement with an adjacent disk stack, or are coupled to one another in movement via suitable spur gears.

It is particularly advantageous if at least one, preferably all disks of a stack close to the outer toothing, on a laterally projecting region, comprise a front-end inner toothing which meshes with the outer toothing of at least one disk of the other disk stack. Such an arrangement permits the construction of disk stacks with only two different disk types, specifically a disk having a comparatively large diameter with an outer toothing as well as a lateral projection and inner toothing, and a disk of a smaller diameter having only outer toothing. Both disks are designed in an annular manner, and in this drive pairing may be unified practically into infinitely large stacks, without having to incorporate design changes on the part of the disk. Then, all disks are also provided with a toothing, and via this toothing may be driven directly and independently of the adjacent disk.

Basically, the outer toothing may be driven via one or even several spurred drive wheels. It is particularly advantageous if two drive wheels which are angularly offset to one another are provided, since then, in combination with a rotatable support of the disks on the outer periphery, preferably lying opposite for drive engagement, a stable three-point mounting is provided which requires no further guiding.

The wipers are advantageously arranged on the disk such that their wide side with a radial encloses an essentially constant angle of preferably 30° to 60°.

Usefully, the wipers of adjacent disks are arranged offset by 90° to one another, and this is advantageous also with regard to a collision of wipers of adjacent disks, since it is then ensured that a wide side of one wiper of a disk always collides with the narrow side of a wiper of the adjacent disk, and that two wide sides or two narrow sides do not abut one another, which possibly may lead to unallowably high force effects.

Preferably, openings are provided in the disk, behind each wiper in the movement direction, roughly parallel thereto, in order to permit a pressure compensation behind the wiper. Preferably, a wiper always lies between two openings, since the wiper is then arranged in the region of a web remaining therebetween, which on account of the material weakening in front of and behind the wiper, gives this a certain movability, which is particularly advantageous with collisions with an oppositely arranged wiper, since a certain deflection is thereby rendered possible.

The wipers are advantageously designed such that they extend up to the adjacent disk, i.e., the heights of the wipers determine the spacing of adjacent disks. Thus, no separate mounting is provided, which fixes the axial distance of the disks to one another, but these may instead be stacked lying on one another, wherein the spacing of the disks to one another is fixed by the height of the wipers. Thus, one need only provide for an end-side support, and as for the rest, the disks lying on one another are to be rotationally supported merely via the central openings, and to be driven by a gear drive on the outer side.

In order to prevent wipers of adjacent disks from becoming damaged or breaking on their collision, it is envisaged according to a further embodiment of the invention, to design the wipers in a beveled manner on their narrow side, which is on the front side in the movement direction, and preferably also on their rear narrow sides. Then, as previously described, if the wipers of adjacent disks are arranged offset by 90° to one another, and furthermore a material weakening in the disk is effected by way of recesses in front of and behind the wipers, then a targeted deflection may take place with a collision of two wipers. Thus, by way of the bevel as a run-on surface, the wiper running on this with its wide side transversely to this, is bent away opposite to the movement direction, and furthermore deflects out of the disk.

A disk having the wipers formed therein and with the drive toothing is advantageously designed as one piece as an injection molded part, and preferably manufactured of polyethylene or polypropylene. Thus, one may manufacture disk stacks of practically any size with only two tools.

These disk stacks are typically applied for the biological treatment of waste-water in a corresponding reactor, wherein the wiper elements ensure that the biological material growth is removed in sections. The guiding of the path is here designed such that, in the course of the hypocycloidal or epicycloidal paths, each disk is brushed over practically completely by the wipers in the course of time. However, the arrangement of the wipers and the speed of the movement is designed such that sufficient biologic material always remains on the disks, in order to treat the fluid guided therebetween. On the other hand, sufficient material is wiped away in order to prevent a clogging of the reactor.

The disks may furthermore comprise recesses, faults or other designs in the form of channels, structures or surface roughness, which among other things prevent the growth base of the microorganisms from being completely removed. The disk stacks are advantageously arranged within a closed reactor, wherein the gear means for the course of movement of the wiper elements are usefully arranged within the reactor, and the drive means arranged outside. The drive means may however also lie within the reactor. Alternatively, the gear means may also lie outside the reactor, which is particularly advantageous when it is expected that larger sediments, which could compromise the function of the gear, are also to be carried along with the fluid As an alternative to the previously described disk stack arrangement with both disk stacks being moved translatorily and rotationally relative to one another, wherein the rotational direction is the same but the rotational speed is different, this or a similar course of movement may also be achieved by a disk stack being arranged within the reactor in a stationary manner, and the other one being accordingly driven in a rotational or translatory manner.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5a illustrates a disk with an outer toothing and inner toothing, in a representation according to FIG. 3, and FIG. 5b is an enlarged representation of the arrangement of wipers in a section of FIG. 5a;

DETAILED DESCRIPTION OF THE INVENTION

Figure 1:
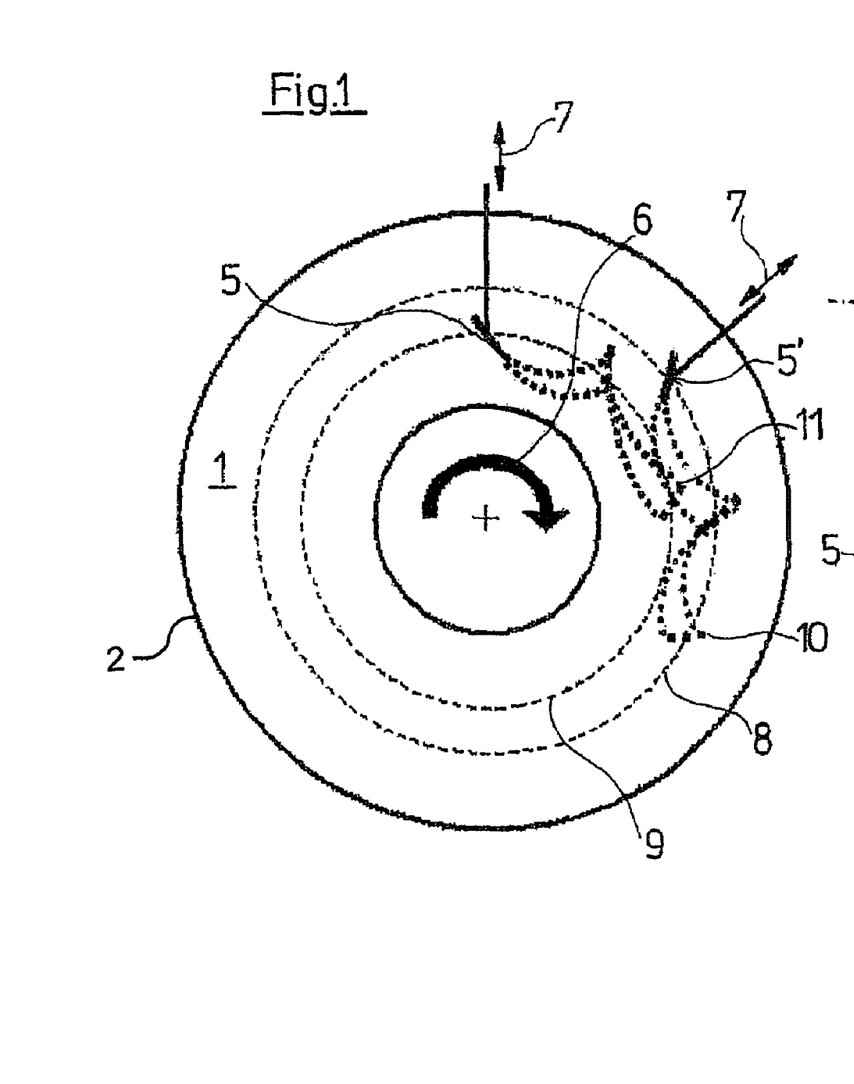
FIG. 1 is a schematic representation in a plan view illustrating the course of movement of wipers on an annular disk.
Figure 2:
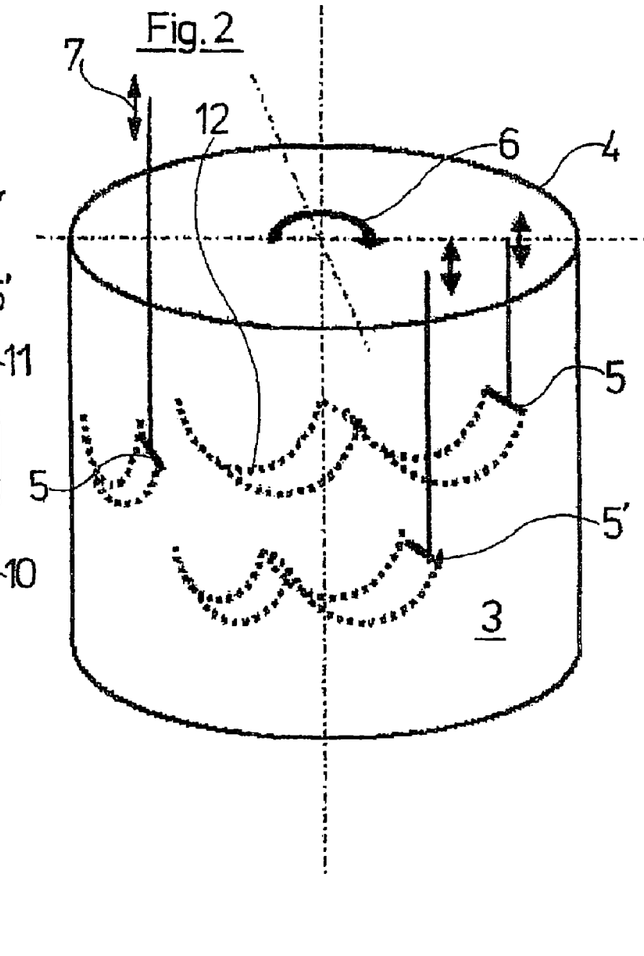
FIG. 2 is a schematic representation in a side perspective view of the course of movement of wipers on a cylinder surface.

By way of FIGS. 1 and 2, it is schematically illustrated how a wiper element in the form of a wiper 5 is to move on a plane surface 1 of a disk 2, or on a curved surface 3 of a cylinder 4, so that the coated surface 1 or 3 is brushed over in sections by the wiper 5, in order to remove and transport away material adhering on the surface 1, 3. With the disk 2 represented in FIG. 1, a rotation of the disk is effected in the rotational direction 6. Furthermore, a translatory movement of the wipers 5 is effected in the radial direction 7. Here, by way of example, two of the wipers are shown, wherein the wiper 5' conveys material from an outer radius 8 to an inner radius 9, and the wiper 5 transports the material, which is pushed to the radius 9 by the wiper 5', further inward from the inner radius 9. The rotational speed of the disk 2 in the direction 6, as well as the translatory movement of the wiper 5 in the direction 7, once to the outside and subsequently to the inside, are matched to one another such that the curves 10 and 11 represented in FIG. 1 result.

As the curve 10 makes clear, the wiper 5' first essentially with its wide side pushes material from the radius 8 to the radius 9, in order then to be guided essentially with its narrow side cutting through the material on a return path on which it reaches the radius 8, from where in turn the wiping procedure is effected with the wide side to the radius 9. There, where the second repeating path of the wiper 5' reaches the radius 9, the material is then taken over by the wiper 5 which likewise then with its wide side first essentially conveys the material radially inward, in order then with its narrow side to get back to the radius 9. It is to be understood, that with a suitable arrangement of corresponding wipers 5, a material transport over the whole surface of the disk 1 to the inside may be effected, and specifically in sections, and in each case on paths, as are represented by way of example in FIG. 1 by the paths 10 and 11.

FIG. 2 shows the system according to the invention by way of a cylinder 4. The cylinder rotates in the rotational direction 6, the wipers 5 and 5' are moved in a translatory manner in the direction 7 parallel to the cylinder axis, and specifically alternately to the top and to the bottom, so that path courses 12 arise with a suitable coupling of the movement, which are similar to those represented by way of FIG. 1. With the embodiment according to FIG. 2, a material transport on the curved surface 3 of the cylinder 4 is effected from the bottom to the top, wherein the path course is such that a wiper first essentially with its narrow side carries out a return movement downwards, in order then with its wide side to again shift upwards, and thereby to catch the material adhering on the cylinder surface 3. Here too, the wipers 5, 5' and further wipers are arranged such that the material removal may be taken over from a lower wiper by the next one lying thereabove. The number of the wipers 5 which is necessary for the complete wiping of the surface 3 is therefore dependent on the travel of the translatory movement.

Figure 3:
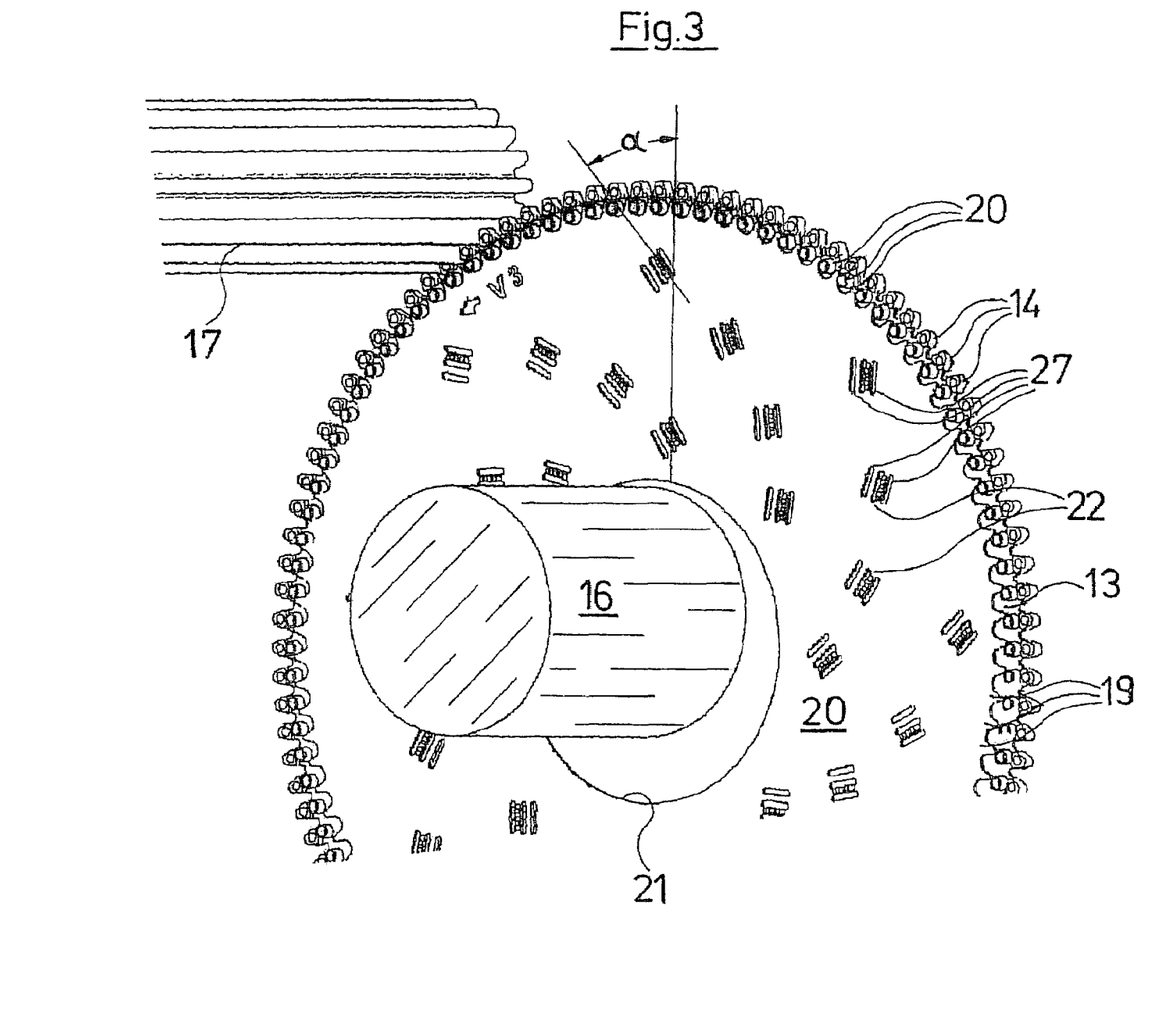
FIG. 3 is a greatly simplified, schematic perspective representation, illustrating the drive and mounting of two adjacent disks which are movable relative to one another.
Figure 4:
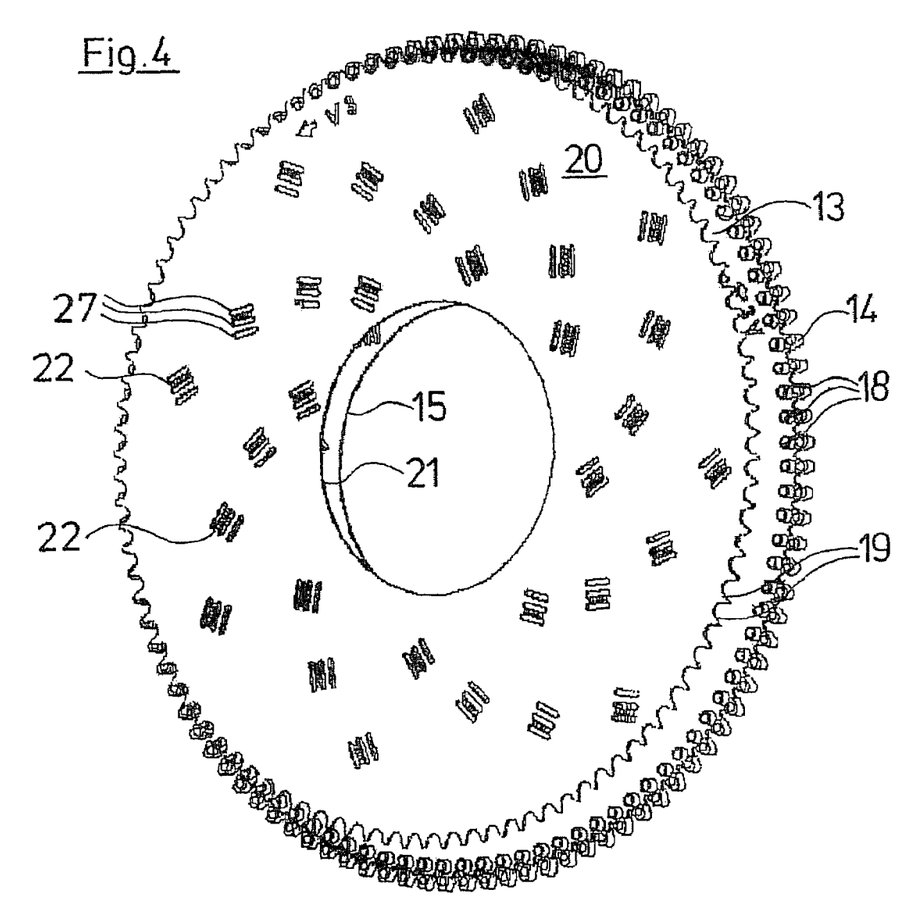
FIG. 4 shows the arrangement of the disks in FIG. 3 relative to one another, in another perspective representation.

Such a course of movement is realized, for example, by way of the arrangement represented schematically by FIG. 3. This comprises an annular, essentially flat disk 13, which is provided with an outer toothing 14 on its periphery. The disk 13 comprises a central inner recess 15 (FIG. 4), through which a bearing journal 16 passes, on which the disk 13 is rotatably mounted and supported. The bearing journal 16 has a smaller diameter than the inner recess 15, so that the mounting of the disk 13 is eccentric.

The disk 13 is driven via a drive pinion 17, which likewise comprises a peripheral-toothing which is in engagement with the outer toothing 14. The drive pinion 17 simultaneously forms the counter bearing to the bearing journal 16, so that the disk is rotated about the axis of the bearing journal 16 on rotation of the drive pinion 17.

The disk 13 to one side close to the outer periphery comprises laterally projecting teeth 18, which are in drive engagement with an outer toothing 19 of a disk 20 of a smaller diameter, which is arranged parallel to and at a spacing therefrom. The disk 20 is circular, just as the disk 13, and comprises a coaxially arranged, circular inner recess 21 which has the same size as the inner recess 15 of the disk 13. A bearing journal 16 likewise passes through this inner recess 21, so that the disk 20 is mounted in a rotationally movable manner between the engagement of its outer toothing 19 with the teeth 18, and the bearing journal 16. The mounting of the disk 20 is also eccentric.

The drive engagement between the inner toothing of the disk 13 formed by the teeth 18, and the outer toothing 19 of the disk 20, only exists in the region opposite the bearing journal support, thus roughly where the drive pinion 17 engages into the outer toothing 14 of the disk 13. Since the outer diameter of the disk 20 is significantly smaller than the inner toothing formed by the teeth 18, the disk 20 may roll within this inner toothing.

Both disks 13 and 20 are designed in an annular manner and, since the tooth number 18 of the inner toothing of the disk 13 corresponds to the tooth number of the outer toothing 14, are driven with the same peripheral speed V3. Since the disks 13, 20 however have a significantly different diameter, different rotational speeds result, so that a relative rotational movement between the disks 13, 20 arises. Since the disks are furthermore mounted in an eccentric manner, the relative movement of the disks to one another is not only rotational, but also translatory.

The tooth number of the outer toothing 14 or of the inner toothing 18 is 103 teeth, whereas the outer toothing 19 of the disk 20 has only 101 teeth. With both numbers it is the case of primary numbers, whereby a corresponding return to the position of the disks 13 and 20 to one another, if for example one considers two points on the disks, only occurs after 10,403 revolutions.

Wipers 22 are arranged on each disk 13 and 20 to both sides, and extend upwards perpendicularly from the disk and have a narrow side 23 and a wide side 24. In each case, two wipers 22 with their narrow sides are arranged next to one another and abutting one another, and are arranged at an angle of about 45° to the radial. Each wiper 22 comprises oblique surfaces 25 to its narrow side ends, which extend essentially from the base material of the respective disk 13, 20 up to the full height of the wiper 22. A wiper 22 only has the full height in a middle region 26, as may be recognized from the detail in FIG. 5a.

A recess 27 which projects beyond the length of the wiper and is of roughly the same width as the wiper is provided towards the wide side 24 and in front of and behind each wiper, within the respective disk 13 and 20, so that a pair of wipers arranged next to one another is always arranged on a web region 28 remaining between two recesses 27.

The wipers 22 which are arranged in pairs are arranged on both sides of each disk 13 and 20, and specifically the wiper arranged on the other disk side is provided roughly at the same location, but at an adjacent web region 28. This is also the reason why three recesses 27 are always arranged next to one another, specifically so that first a wiper pair 22 may be arranged to one side on the first web region 28 formed between two recesses 27, and a wiper pair 22 may then be arranged on the other web region on the other side (on the rear side in the drawing).

Figure 5:
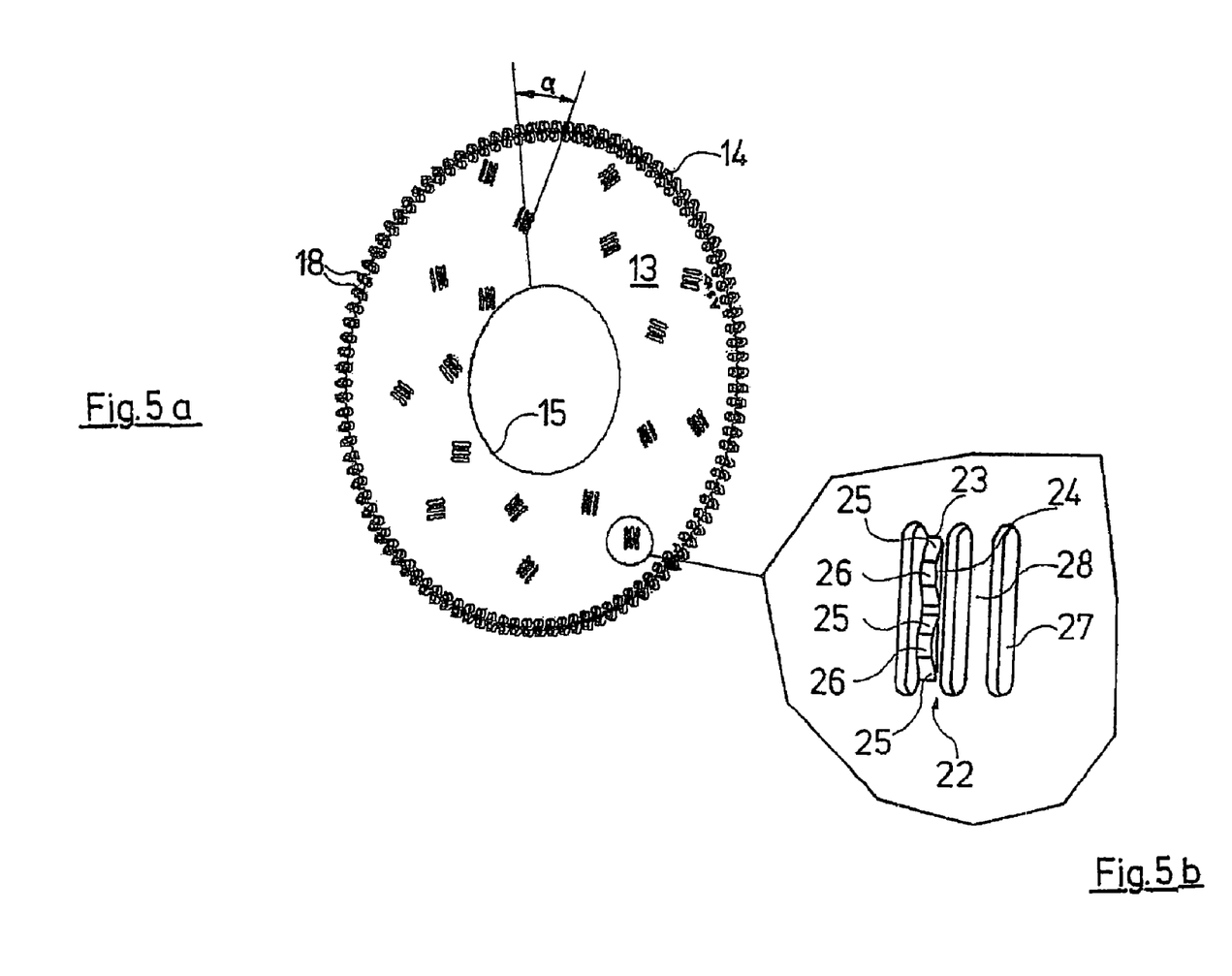

Although the wipers of a disk 13 are always arranged at an angle α of 30° to 60°, here 45° to the radial (angle α between the wide side of a wiper and a radial), and specifically on both sides of a disk, the directions of the wipers 22 on the large disk 13, however, differ from those on the small disk 20. Specifically, these are arranged at an angle of 90° to one another, as clarified, for example, with a comparison of the direction of the wipers in FIGS. 4 and 5.

The disks 13 and 20 are in each case formed as one piece with the wipers 22 and are manufactured as plastic injection molding parts. They are in each case arranged in pairs. Thus, a large disk 13 with a small disk 20 lying therein, and a large disk 13 connecting thereto, again with a small disk 20 lying therein, are arranged in an alternating manner into stacks 33, as illustrated by way of FIG. 6.

The spacing of the disks from one another is determined by the height of the wipers 22, and specifically by their height in the middle region 26. With disks lying on one another 13 and 20 (FIG. 6), these therefore bear loosely on one another in the axial direction of the bearing journal 16, but however are otherwise mounted with their inner recesses 15 and 21 on the bearing journal 16, and are clamped-in and drivingly connected, by way of the opposite drive pinion 17.

Since the wipers 22 extend from each disk to the adjacent one and vice versa, a collision between the two wipers 22 of adjacent disks 13, 20 may occur. Since the wipers 22 of the disks 13 and those of the disks 20 are arranged offset by 90° to one another, in the case of a collision, a wiper 22 with its wide side 24 always hits a wiper 22 with a narrow side 23 of an oppositely lying disk. The oblique surfaces 25 are provided so that an impact-like introduction of force and a damage to a wiper 22 is not effected here, and these surfaces ensure that the wiper 22 with a narrow side 23 elastically displaces the opposite wiper 22 on its wide side 24. For this purpose, the web regions 28 are useful, since on account of the targeted material weakening, they permit the wiper 22 to be able to deflect also in the region of the disk itself, thus in this web region. The wipers 22 of opposite disks 13 and 20 may thus deflect elastically, but on the other hand they determine the spacing of the disks. Thus, with their middle region 26 of the full height, they bear on the opposite disk, where they ensure a material removal up to the base of the disk.

By way of the fact that the disks 13 and 20 undergo a rotational as well as a translatory movement, each wiper 22 on the opposite disk side brushes over an epicycloidal or hypocycloidal path. These paths are represented in more detail by way of the FIG. 12 to 14.

Figure 12:
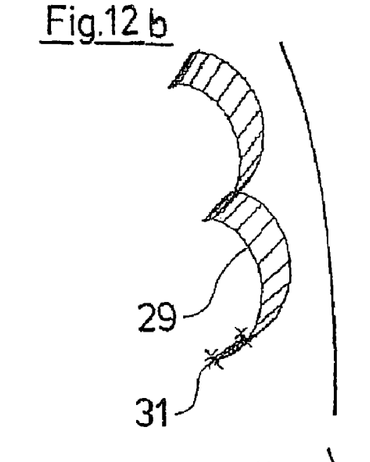
FIGS. 12a and 12b are schematic, perspective representations of the path course of two wipers on an inner and an outer epicycloidal path.
Figure 12A:
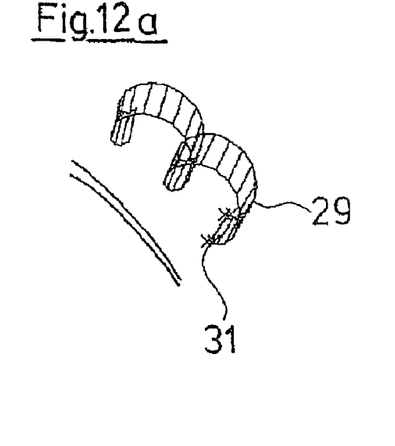
Figure 13:
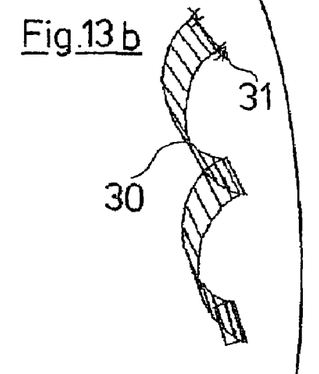
FIGS. 13a and 13b are schematic, perspective representations of the path course of two wipers on an inner and an outer hypocycloidal path.

Specifically, as shown in FIGS. 12a and b, the wipers 22 arranged on the small disk 20 produce epicycloidal paths 29 of different wavelength on the large disk, depending on the radial arrangement. The wipers 22 on the large disk 13 produce hypocycloidal paths 30 on the small disk 20, and specifically here too differing in their wavelength, depending on the radial arrangement of the respective wiper, as represented in FIG. 13.

With the epicycloidal paths 29, the wiper 22 from a starting point 31 first executes a returning path, on which it is moved essentially with a narrow side 23. When it has then reached the maximum radius of the disk which it has just brushed over, it pushes material essentially with its wide side 24 radially inward before it again undergoes a returning path with its narrow side 23.

Figure 13A:
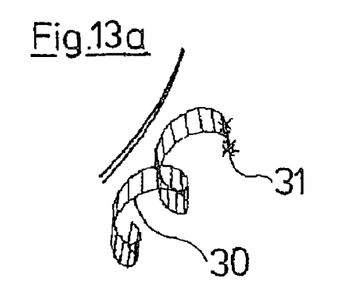
Figure 14:
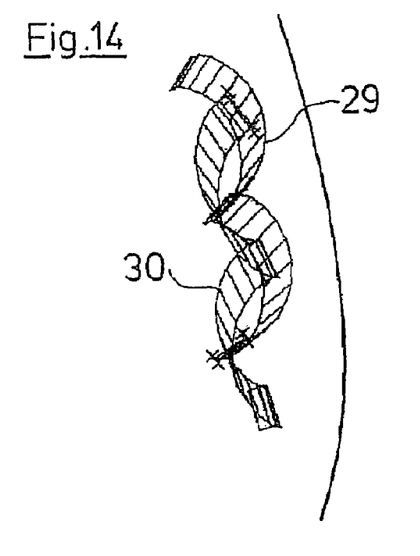
FIG. 14 is a schematic, perspective representation of the path course of wipers of opposite disks.

With the hypocycloidal paths 30, the course of movement is essentially in reverse, i.e., first, an essentially radial movement with the wide side 24 is effected, by which the material is displaced on an inner radius, whereupon a return path with the narrow side 23 again leads onto the outer radius. The wipers 22 are arranged on the disks 13 and 20, such that the epicycloidal or hypocycloidal paths 29 and 30 radially overlap, so that the material transport which is effected from a wiper radially inward, is displaced further inward by a wiper which lies further to the inside. Since all paths are revolving, a complete material removal is effected in the course of time. Due to the fact that material is always only removed in sections, one ensures, on the one hand, that an adequate flow cross section between adjacent disks 13 for the permeation of the fluid is provided and, on the other hand, that material is accumulated on the disks 13, 20, in order to ensure a sufficient treatment of the fluid. The through-flow in the shown embodiment is effected from the outside to the inside, but may however also be effected in the reverse direction. The transport functions of the wipers and of the fluid flow supplement one another, in that a thinning is effected by the fluid, and a through-mixing is effected by the wipers. FIG. 14 illustrates which paths the wipers of opposite disks undergo, and this representation also illustrates that the wipers 22 always meet one another at a 90° angle when they collide.

Figure 6:
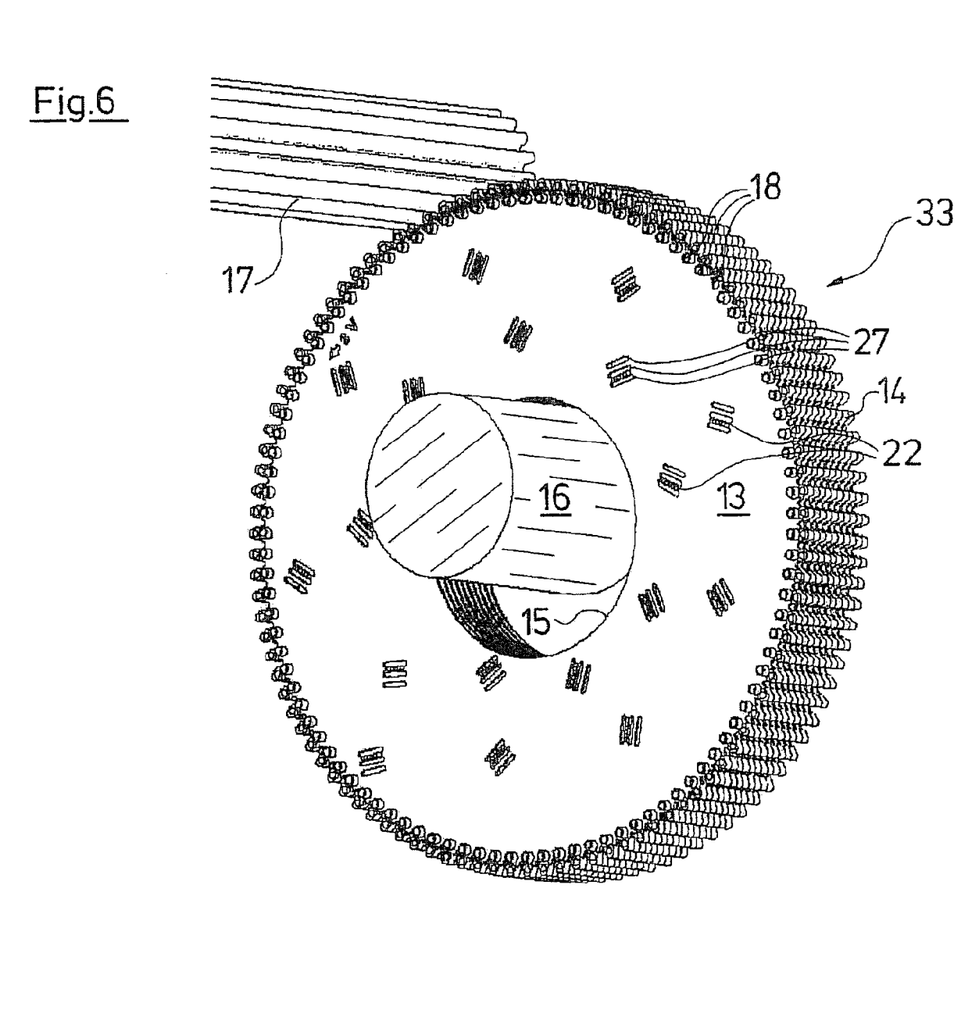
FIG. 6 is a schematic perspective representation showing the mounting and drive of a disk stack according to FIG. 3.
Figure 9:
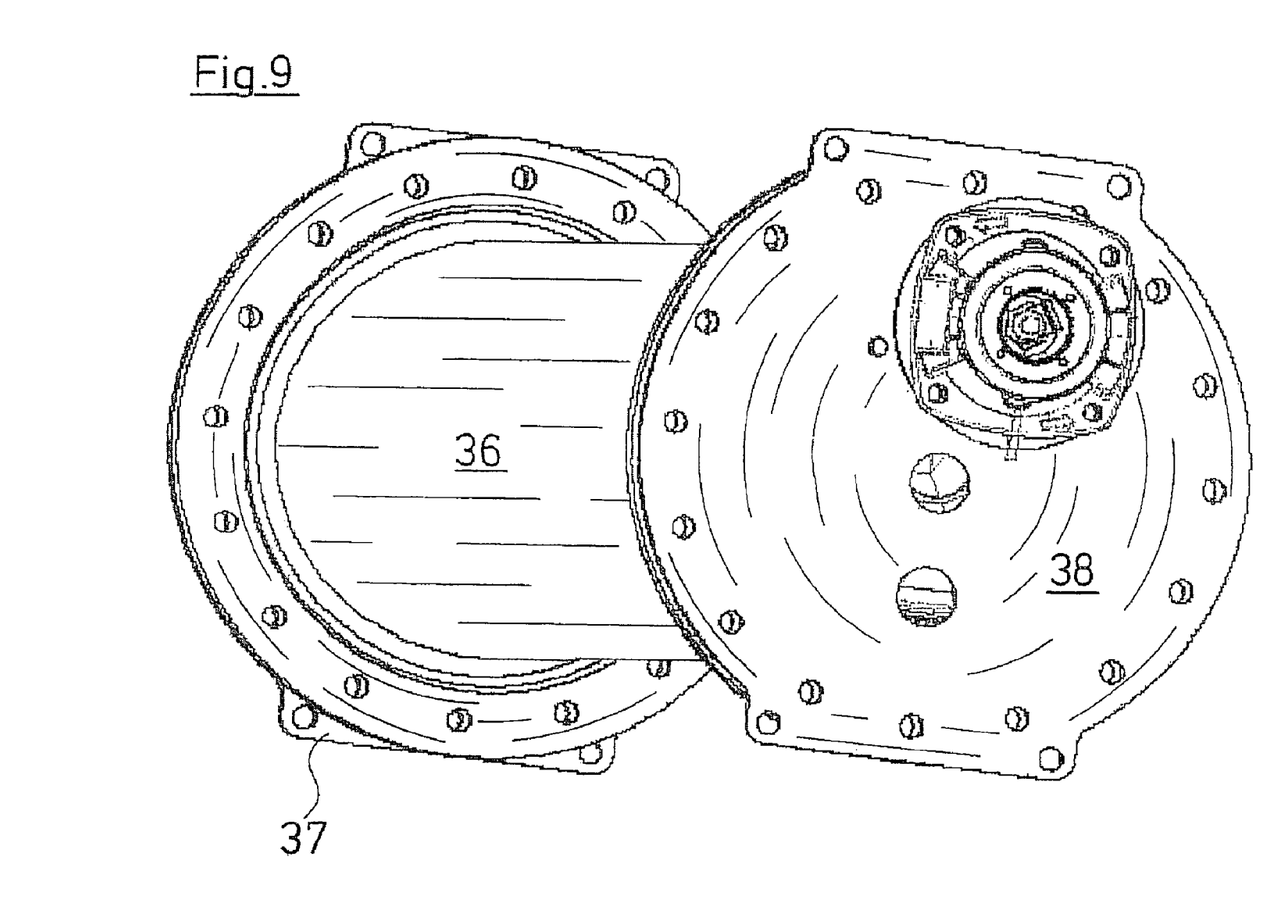
FIG. 9 is a perspective representation of a reactor with disk stacks located therein.
Figure 10:
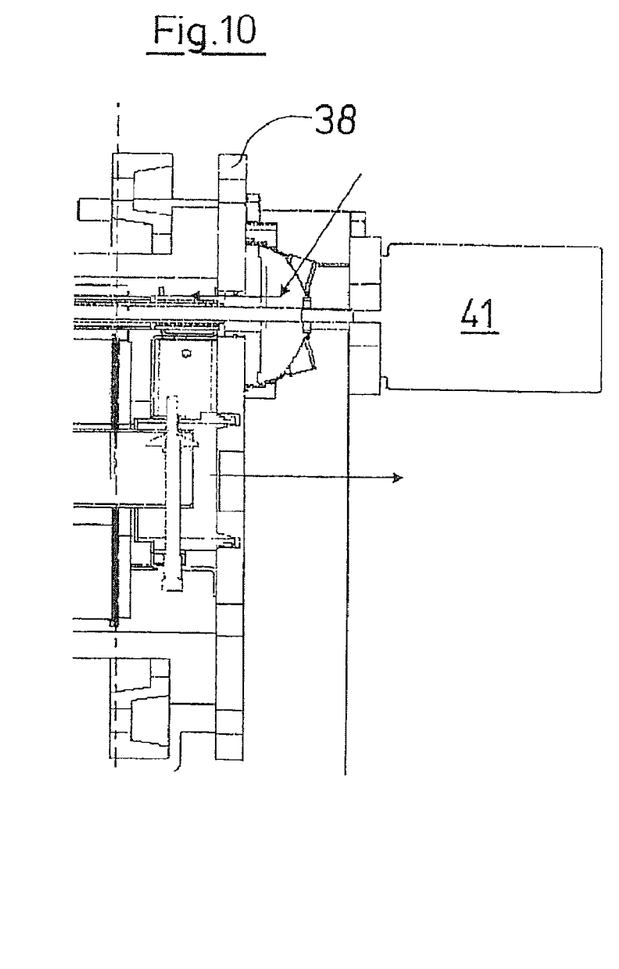
FIG. 10 is a partial cross section of the reactor according to FIG. 9 in the region of the drive passage.
Figure 11:
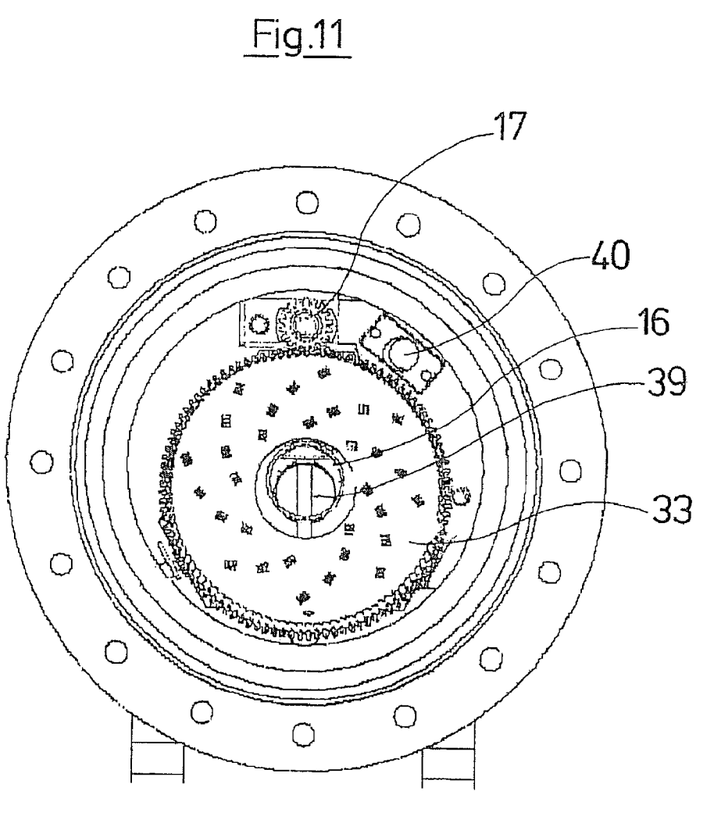
FIG. 11 is an end view of the reactor according to FIG. 9, with a removed front cover.

The disk stack 33 with a bearing journal 16 and drive pinion 17, which is represented schematically by FIG. 6, may for example be integrated into a reactor 35 represented by FIGS. 9 to 11. The reactor has an essentially cylindrical housing 36 which is terminated at the ends by two flanged-on covers 37, 38. The cover 38, which is at the front in FIG. 9, has a fluid entry opening 39 as well as a central fluid exit opening 40 (FIG. 11). A disk stack according to FIG. 6 is arranged within the cylindrical housing 36, and is rotatably arranged on the journal 16. The drive pinion 17, as the disk stack 33, extends over almost the complete length of the cylindrical housing 36 with which it is in engagement. The shaft carrying the pinion 17 is sealingly led out through the front cover 38, where a drive motor 41 is flanged on.

The fluid to be treated goes through the fluid inlet opening 39 in the cover 38 into the cylindrical housing 36, and from there, from the outside to the inside, through the disk stack 33 along the channels created by the wipers. The fluid is led away again via the free space formed between the journal 16 and the inner recesses 15 and 21 of the disk stack 33, and the fluid exit opening 40. Together with the fluid to be treated, the removed material is also led away via the fluid exit opening 40.

Figure 7:
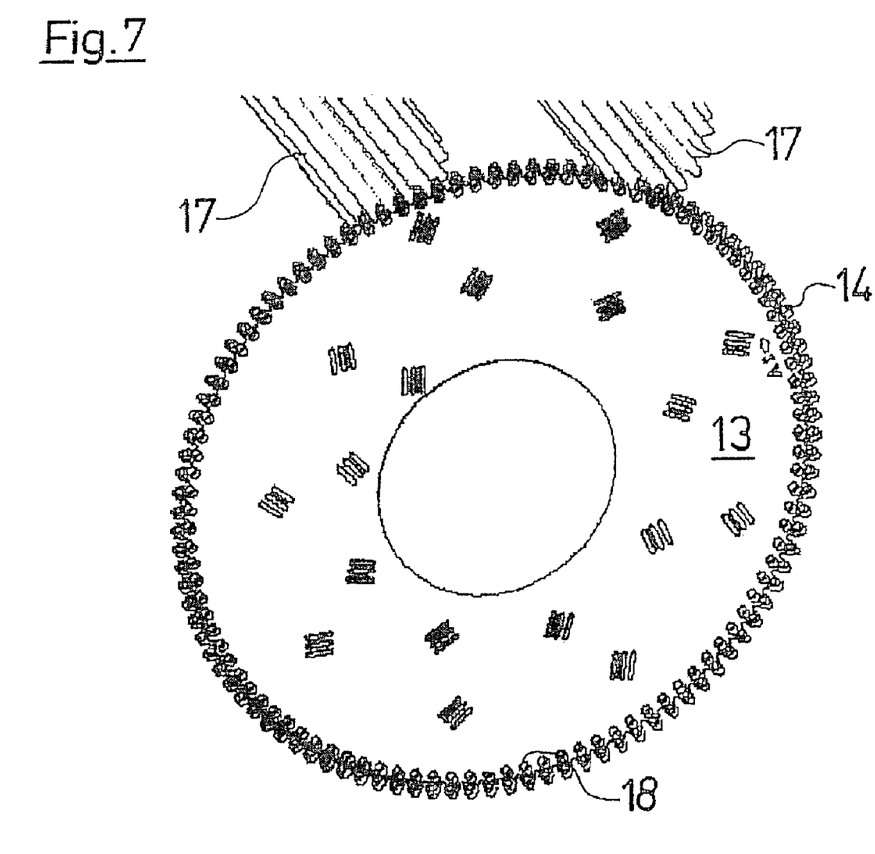
FIG. 7 is a schematic perspective representation showing an alternative mounting/alternative drive according to FIG. 3.

With the previously described embodiment, the drive and the mounting of the disk stack 23 is effected via a two-point mounting. It is shown by FIG. 7 how a three-point mounting may be effected in that a further driven or, as the case may be, only co-rotating pinion 42 is provided next to the drive pinion 17, and is likewise toothed at the end, and in engagement with the disk stack. All previously mentioned components may advantageously be manufactured of plastic. In particular, one applies those plastics which have also been tested in wastewater technology.

Figure 8:
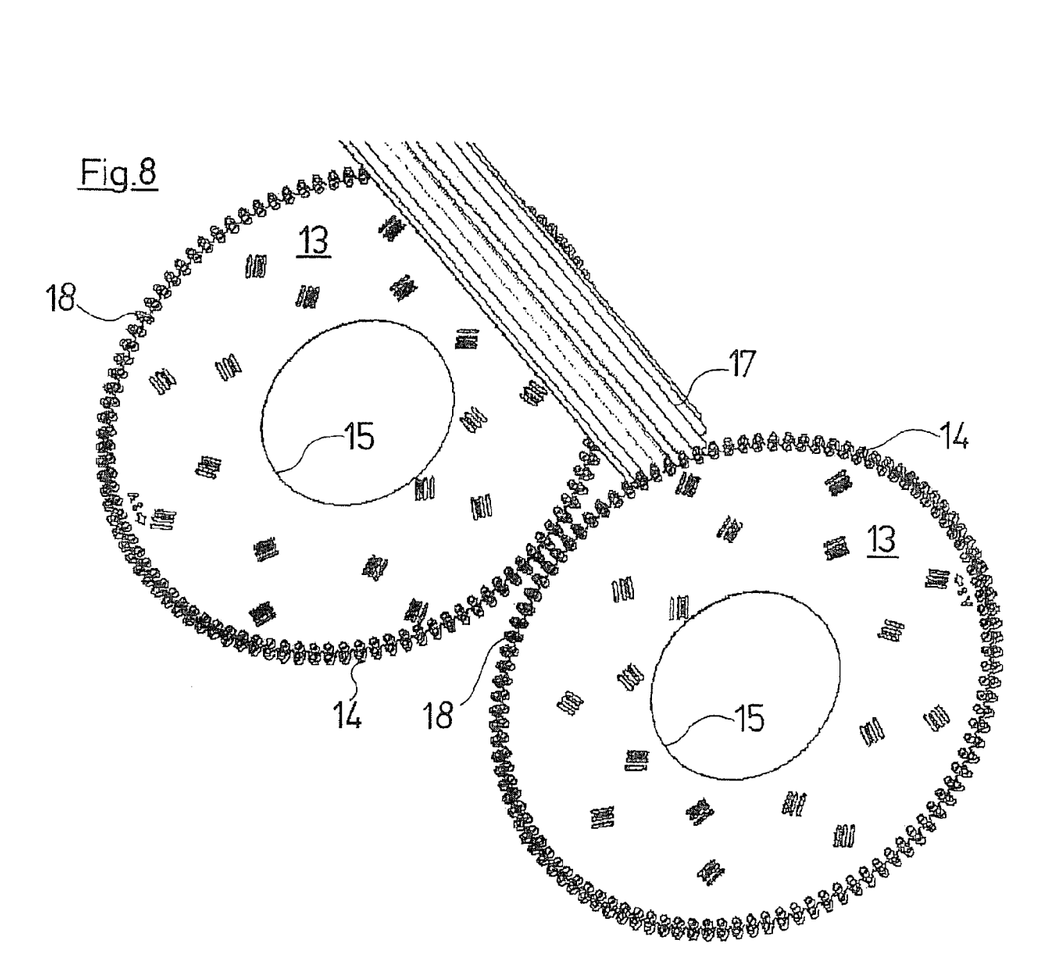
FIG. 8 is a schematic perspective representation showing the drive of two disk stacks with a common drive spur gear according to FIG. 3.

FIG. 8 shows how several disk stacks 33 may be drivingly connected to one another. The disk stacks 33 in FIG. 8 are arranged with a spacing from one another, but are both engaged by the drive pinion 17 with a positive fit, so that they are coupled in movement. Thus, one may also drive two disk stacks 33 with one drive pinion 17, and it is to be understood that the reactor housing is to be adapted accordingly. Practically any number of disk stacks may be arranged next to one another and rotationally connected, and the length of the disk stacks may also be varied without having to change the basic construction elements with regard to their construction, specifically the disk 13 and 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for fluid treatment, in particular for waste-water treatment, in which the fluid is led along or through at least one surface coated with material, comprising at least one wiper element (5, 22), which brushes over the at least one surface in a pathwise course, wherein the pathwise course (29, 30) is selected such that the at least one surface is brushed over successively in sections, and wherein the at least one wiper element (5, 22) comprises a narrow side (23) and a wide side (24), and is guided in the pathwise course in a manner such that it alternately wipes on a first path section in a first direction essentially with its wide side (24), and then on a second path section in a second direction essentially with its narrow side (23).

2. The device according to claim 1, wherein several of the at least one wiper elements (5, 22) are provided, which brush over different pathwise courses.

3. The device according to claim 1, wherein the at least one surface forms a surface of a filter, and the at least one wiper element is provided for removing sediments.

4. The device according to claim 1, wherein the at least one surface is a lateral surface of a cylinder (4), and a wide side of the at least one wiper element runs essentially parallel to an axis of the cylinder.

5. The device according to claim 1, wherein the at least one surface is formed by sides of disks (13, 20) which are movable relative to one another, and wherein the at least one wiper element is allocated to one disk side.

6. The device according to claim 5, wherein the disks (13, 20) are arranged parallel to one another with a spacing, and the at least one wiper element is effective between adjacent ones of the disks (13, 20).

7. The device according to claim 6, wherein the at least one wiper element is formed by wipers (22) which extend essentially perpendicularly from one of the disks (13, 20) in a direction of an opposite one of the disks (20, 13).

8. The device according to claim 7, wherein the wipers (22) are arranged such that with their wide side (24) and a radial they enclose an essentially constant angle ($\alpha$) of 30° to 60°.

9. The device according to claim 7, wherein the wipers (22) of adjacent disks (13, 20) are offset by 90° to one another.

10. The device according to claim 7, wherein openings (27) are provided in the disks (13, 20) in front of and/or behind the wipers (22).

11. The device according to claim 7, wherein heights of the wipers (22) determine the spacing of adjacent disks (13, 20).

12. The device according to claim 7, wherein the wipers (22) on their narrow side (23) which is on a front end in a movement direction are beveled.

13. The device according to claim 7, wherein the disks (13, 20) with the wipers (22) formed thereon and drive toothings (14, 18, 19) are designed as one piece as a plastic injection molded part.

14. The device according to claim 5, wherein adjacent ones of the disks (13, 20) are driven to be moved rotationally or translatorily to one another.

15. The device according to claim 5, wherein the disks (13, 20) are arranged parallel to one another, and movement of the disks (13, 20) relative to one another is effected in planes parallel to the disks (13, 20).

16. The device according to claim 5, wherein adjacent ones of the disks (13, 20) are moved relative to one another in a manner such that the at least one wiper element on an opposite disk with its wide side (24) describes an essentially radial working path, and subsequently with its narrow side executes a return path, or vice versa, wherein a beginning of the return path and an end of the working path lie on a same disk radius, and vice versa.

17. The device according to claim 5, wherein the at least one wiper element is guided on a hypocycloidal path or an epicycloidal path (30, 29) over one of the disks (13, 20).

18. The device according to claim 17, wherein several of the at least one wiper element on hypocycloidal or epicycloidal paths (30, 29) are guided over the disks (13, 20) on different radii, in a manner such that the hypocycloidal or epicycloidal paths (30, 29) run in annular sections which connect to one another or overlap one another, such that a material transport from one disk diameter to another disk diameter is preferably effected from the outside to the inside.

19. The device according to claim 5, wherein the at least one wiper element of one of the disks describes epicycloidal paths (29), and the at least one wiper element of an adjacent one of the disks describes hypocycloidal paths (30).

20. The device according to claim 5, wherein the disks (13, 20) are formed by at least two disk stacks (33) which are arranged such that one disk (13) of a first stack is adjacent at least to one disk (20) of a second stack, and wherein a fluid to be treated is guided between these adjacent disks of the disk stack.

21. The device according to claim 20, wherein adjacent ones of the disks (13, 20) or disk stacks are driven in a same direction but at a different rotational speed.

22. The device according to claim 20, wherein the disks (13, 20) have an annular shape and the fluid flows through a central channel formed by central recesses (15, 21) in the disks (13, 20), and between the disks.

23. The device according to claim 20, wherein pairs of the disks (13, 20) lying adjacent to one another are mounted and driven eccentrically to one another.

24. The device according to claim 20, wherein the disks (13, 20) of the disk stacks engaging into one another have an annular shape, have different outer diameters with essentially a same radial annular width, are rotatably mounted and are essentially driven at a same peripheral speed.

25. The device according to claim 20, wherein the disks (13, 20) of at least one disk stack have an end-side outer toothing.

26. The device according to claim 25, wherein at least one of the disks (13) of a disk stack close to the outer toothing on a projecting region comprises an end-side inner toothing (18), with which the outer toothing of at least one disk (20) of another disk stack meshes.

27. The device according to claim 25, wherein all disks (13, 20) comprise an outer toothing and are driven.

28. The device according to claim 25, wherein the outer toothing of the disks (13) is drivingly connected to two drive wheels (17) angularly offset to one another.

29. The device according to claim 20, wherein one of the disk stacks is arranged within a reactor in a stationary manner, and another of the disk stacks is driven.

30. The device according to claim 5, wherein the disks (13, 20) are rotatably supported on an inner periphery, in an oppositely lying manner, for drive engagement.

31. The device according to claim 5, wherein the disks (13, 20) with the at least one wiper element (22) form part of a biological waste-water treatment reactor (35), and wherein the at least one wiper element (22) removes the biological material growth.

32. The device according to claim 31, further comprising gear means (17) for movement of the at least one wiper element (22) in the pathwise course, the gear means being arranged within the reactor, and drive means lying outside the reactor for driving the gear means.

33. The device according to claim 31, further comprising gear means and drive means for movement of the at least one wiper element in the pathwise course, the gear means and the drive means being arranged outside the reactor.

34. The device according to claim 5, wherein the disks with the at least one wiper element form a chemical reactor, and wherein the at least one wiper element removes at least parts of a chemical reaction product.

35. The device according to claim 5, wherein the disks comprise recesses in the form of channels, structures or surface roughness.

* * * * *